United States Patent [19]
Cranford, Jr. et al.

[11] Patent Number: 6,087,861
[45] Date of Patent: Jul. 11, 2000

[54] DATA NETWORK DRIVERS INCLUDING BALANCED CURRENT SUPPLIES AND RELATED METHODS

[75] Inventors: Hayden Clavie Cranford, Jr., Apex, N.C.; Jonathan Henry Raymond, Jericho, Vt.; Randall S. Smith, Raleigh, N.C.; Stephen Dale Wyatt, Jericho, Vt.

[73] Assignee: International Business Machines Corporation, Armonk, N.Y.

[21] Appl. No.: 09/023,020

[22] Filed: Feb. 11, 1998

[51] Int. Cl.[7] .......................................... H03B 1/00
[52] U.S. Cl. ............................. 327/108; 327/538
[58] Field of Search ................... 326/30, 82, 83, 326/84, 85, 86, 87, 89, 90, 91; 327/108, 109, 110, 111, 112, 538, 543; 395/872

[56] References Cited

U.S. PATENT DOCUMENTS

| | | | |
|---|---|---|---|
| 5,127,046 | 6/1992 | Malm | 379/98 |
| 5,204,880 | 4/1993 | Wurster et al. | 375/36 |
| 5,404,497 | 4/1995 | Baumann et al. | 375/7 |
| 5,425,054 | 6/1995 | Huang | 375/258 |
| 5,446,914 | 8/1995 | Paul et al. | 395/800 |
| 5,465,272 | 11/1995 | Smith | 375/295 |
| 5,467,369 | 11/1995 | Vijeh et al. | 375/224 |
| 5,485,488 | 1/1996 | Van Brunt et al. | 375/257 |
| 5,490,171 | 2/1996 | Epley et al. | 375/257 |
| 5,541,957 | 7/1996 | Lau | 375/258 |
| 5,592,510 | 1/1997 | Van Brunt et al. | 375/220 |
| 5,694,060 | 12/1997 | Brunt et al. | 326/86 |

OTHER PUBLICATIONS van de Plassche, Rudy, *Integrated Analog–to–Digital and Digital–to–Analog Converts* Kluwer Academic Publishers, p. 232.

Boiocchi, S., et al *Self–Calibration in High Speed Current Steering CMOS D/A Converts,* Second Int'l Conference on Advanced A–D and D–A Conversion Techniques and their Applications, pp. 148–152 (Jul. 6–8, 1994).

*Primary Examiner*—Jeffrey Zweizig
*Attorney, Agent, or Firm*—John D. Flynn; Myers Bigel Sibley & Sajovec

[57] ABSTRACT

A network driver includes first and second driver circuits and a controller which controls the driver circuits. The first driver circuit is coupled to a first node, and the first driver circuit sources first and second discrete currents to the first node and sinks first and second discrete currents from the node. The second driver circuit is coupled to a second node, and the second driver circuit sources the first and second discrete currents to the second node and sinks the first and second discrete currents from the second node. The controller controls the driver circuits so that the first driver circuit sources and the second driver circuit sinks the first current followed by the second current and so that the first driver circuit sinks and the second driver circuit sources the first current followed by the second current. Related methods are also discussed.

37 Claims, 5 Drawing Sheets

DATA NETWORK DRIVERS INCLUDING BALANCED CURRENT SUPPLIES AND RELATED METHODS

FIELD OF THE INVENTION

The present invention relates to the Field of electronics and more particularly to waveform generators and related methods for electronic devices.

BACKGROUND OF THE INVENTION

A data network is a communications system that allows personal computers, workstations, servers, and other electronic network devices to transfer data between each other. Each device connected to the network communicates with other devices according to a standard which defines the operation of the network. For example, the IEEE 802.3 CSMA/CD Ethernet Protocol is a standard commonly used for local area networks (LANs). The Ethernet Protocol provides for data transmission over coaxial cables and twisted pair cables.

In order to provide a connection between a network device and the network, a network device may include a network interface controller, a serial network interface, and a transceiver. According to the Ethernet Protocol, the network interface controller implements media access control layer functions, and the serial network interface provides Manchester data encoding and decoding functions. The transceiver can be connected to the network via an isolation transformer. Network connections are discussed for example in U.S. Pat. No. 5,446,914 to Paul et al. entitled "Twisted Pair And Attachment Unit Interface (AUI) Coding And Transceiving Circuit With Full Duplex, Testing, And Isolation Modes," the disclosure of which is incorporated herein in its entirety by reference.

In particular, the Paul et al. patent discusses a twisted pair waveform generator that includes a filter function, a shielded/unshielded cable driver function, and a low idle current driver function. More particularly, this patent discusses a twisted pair waveform generator that drives the transmit output signals onto an external summing register network as square-wave current signals.

Known network driver circuits, however, may require undesirably complex and/or costly filters to meet the network transmission protocol. The relatively high degree of filtering may thus increase the cost of the network implementation. Known network driver circuits may also consume undesirable levels of power.

SUMMARY OF THE INVENTION

In light of the above discussion, it is therefore an object of the present invention to provide improved network drivers and methods.

It is another object of the present invention to provide network drivers and methods which improve wave shapes.

It is still another object of the present invention to provide waveform generators and methods which reduce power consumption.

These and other objects are provided according to the present invention by network drivers including push-pull driver circuits wherein current is concurrently sourced to a first node and sunk from a second node and current is then concurrently sourced to the second node and sunk from the first node. A balanced waveform can thus be generated across the two nodes. Moreover, during periods when no generation is required, no currents are sourced and/or sunk, thereby reducing power consumption. Therefore, the network drivers of the present invention can be used to generate data for a network wherein the two nodes are coupled to a data cable through an isolation transformer. In addition, by sinking and sourcing a plurality of discrete currents, the resulting wave shape can be generated so as to reduce additional filtering.

In particular, a network driver according to the present invention can include first and second driver circuits and a control circuit. The first driver circuit is coupled to the first node, and the second driver circuit is coupled to the second node. The first driver circuit sources first and second discrete currents to the first node and sinks the first and second discrete currents from the first node. The second driver circuit sources the first and second discrete currents to the second node and sinks the first and second discrete currents from the second node. The controller controls the driver circuits so that the first driver circuit sources and the second driver circuit sinks the first current followed by the second current and so that the first driver circuit sinks and the second driver circuit sources the first current followed by the second current. By sinking and sourcing a plurality of discrete currents, a waveform of arbitrary shape can be generated, thereby reducing the need for additional filtering.

The first driver circuit can include a first sourcing current source and a first sinking current source. The first sourcing current source is coupled between the first output node and a first reference voltage and the first sourcing current source sources current to the first output node when activated. The first sinking current source is coupled between the first output node and a second reference voltage, and the first sinking current source sinks current from the first output node when activated. Similarly, the second driver circuit can include a second sourcing current source coupled between the second output node and the first reference voltage, and a second sinking current source coupled between the second output node and the second reference voltage. The controller activates the current sources in pairs so that the first sourcing current source and the second sinking current source are commonly activated, and so that the second sourcing current source and the first sinking current source are commonly activated.

The controller can activate the pairs of current sources as balanced current sources. In particular, the first sourcing current source and the second sinking current source can respectively source and sink a first common current when activated, and the second sourcing current source and the first sinking current source respectively source and sink a second common current when activated. Moreover, the first common current can advance from a first one of the discrete currents to a second one of the discrete currents when the first sourcing current source and the second sinking current source are activated. In addition, the second common current can advance from the first discrete current to the second discrete current when the second sourcing current source and the first sinking current source are activated.

The controller can also provide that the first sourcing and sinking current sources are not activated concurrently and that the second sourcing and sinking current sources are not activated concurrently. Furthermore, the network driver of the present invention can be used to drive the first and second nodes wherein a first impedance is provided between the first node and a common node and wherein a second impedance is provided between the second node and the common node. The network driver can include a voltage source for maintaining a voltage at the common node equal to one half a difference between the first and second reference voltages. In addition, a bias adjustor can be used to detect an imbalance between the currents sourced by the sourcing current sources and the currents drawn by the sinking current sources. This bias adjustor adjusts a bias of at least one of the current sources responsive to the detected imbalance to reduce the imbalance.

The network driver according to the present invention can thus be used to drive a data network cable coupled to the first and second nodes through an isolation transformer. The waveforms generated can have improved wave shapes so that reductions in additional filtering can be achieved. In addition, the current sources can be turned off when there is no transmission thereby reducing power consumption.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
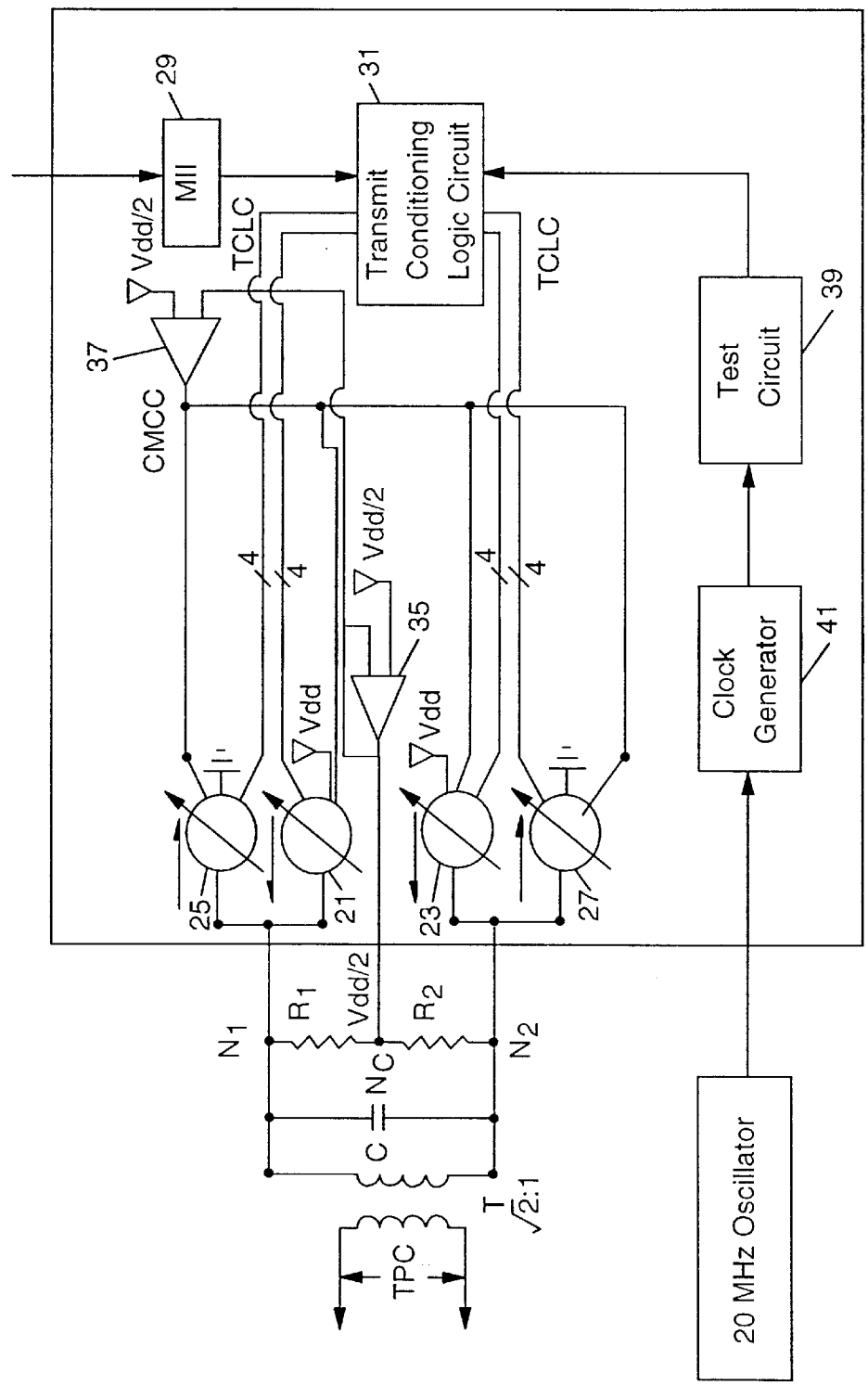
FIG. 1 is a block diagram of a circuit for generating waveforms according to the present invention.

A block diagram of a network driver (also referred to as a network waveform generator) according to the present invention is illustrated in FIG. 1. This network driver can be compatible with Ethernet Protocol networks, and more particularly with Ethernet Protocol Twisted Pair Cable Networks according to IEEE Standard 802.3 ISO/IEC 8802-3, Part 3. As shown, the network driver includes four current sources 21, 23, 25, and 27 wherein sourcing current sources 21 and 23 respectively source (or provide) current to nodes N1 and N2, and wherein sinking current sources 25 and 27 respectively sink (or draw) current from Nodes N1 and N2. The network driver can also include a Media Independent Interface (MII) 29 and Transmit Conditioning Logic Circuit (TCLC) 31 to provide parallel to serial encoding, generate a Manchester encoded data stream, and generate the control signals to drive the current sources.

The sourcing current sources 21 and 23 are respectively coupled between the device power supply voltage Vdd and the Nodes N1 and N2, and the sinking current sources 25 and 27 are respectively coupled between the device ground and the Nodes N1 and N2. The TCLC 31 controls the current sources as pairs in such a manner that current sources 21 and 27 operate as a pair and current sources 23 and 25 operate as a pair. In other words, current source 21 sources current into Node N1 and current source 27 simultaneously sinks current from Node N2, or current source 23 sources current into Node N2 and current source 25 simultaneously sinks current from Node N1. Furthermore, all current sources can be switched off when the device is not transmitting thereby reducing power consumption.

The Nodes N1 and N2 are shown coupled to a twisted pair cable through a transformer T having a turns ratio of the square root of 2 to 1 thereby providing isolation between the waveform generator and the twisted pair cable. A filtering capacitor C and a pair of serially connected resistors R1 and R2 are also provided between the, Nodes N1 and N2. The resistors R1 and R2 are connected at a Common Node Nc which can be maintained, for example, at one half the system power supply Vdd/2 using the operational amplifier 35. The resistors R1 and R2 preferably have equal resistances which can be in the range of 25 to 30 ohms. A common mode correction circuit (CMCC) 37 can also be used to monitor the voltage of the Common Node Nc and to adjust the current sources to maintain balanced currents. The resistors R1 and R2 and the capacitor C provide a low pass filter to remove higher order harmonics related to the switching frequencies of the current sources and the sub-sources therein.

As shown, the current sources 21, 23, 25, and 27, the operational amplifier 35, TCLC 31, MII 29, and common mode correction circuit 37 can be implemented on a single integrated circuit chip, and the resistors R1 and R2 can be provided externally thereby reducing heat generated on the chip. Alternately, the resistors R1 and R2 can be implemented on the integrated circuit chip. The media independent interface 29 provides parallel to serial encoding for systems, such as Ethernet systems, which pass parallel data to the transmit conditioning logic.

The integrated circuit chip can also include a clock generator 41 and a test circuit 39. For example, an integral self-test capability can be provided thereby enabling the use of Built-In Self Test (BIST) with a variety of testers. Drive levels can be inferred during the testing procedure for better test coverage of parametric values. The transmit condition logic circuit 31 can accept inputs from the test circuit 39 and provide test patterns to enable sequential circuit and current source test during either wafer or module testing. The test circuit provides the sequence of patterns for chip and module tests. In addition, the integrated circuit chip can also include higher levels of functionality such as data processing.

Figure 2:
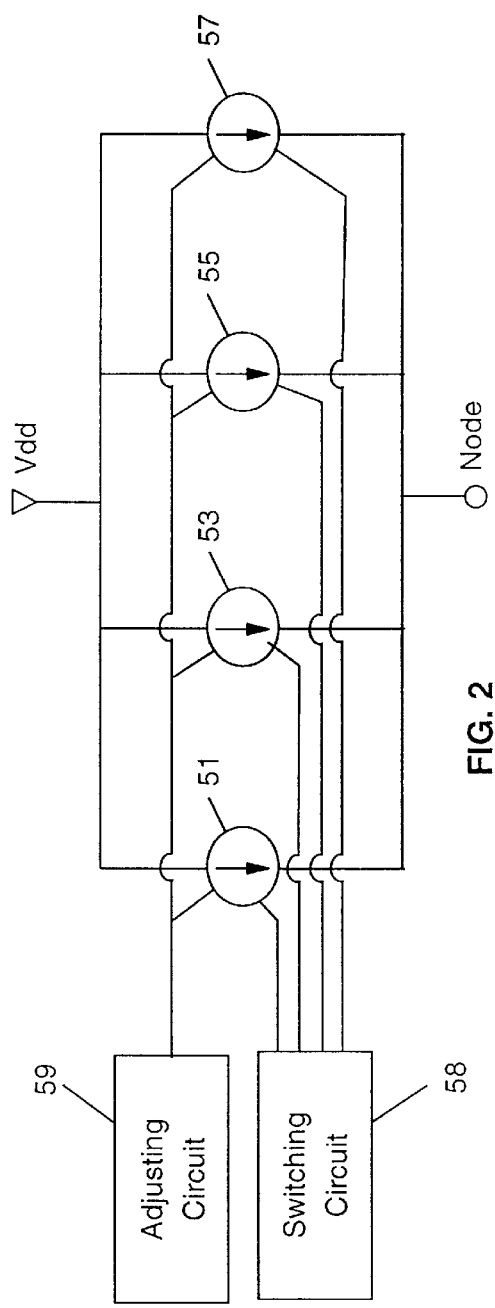
FIG. 2 is a block diagram of a bank of P-channel sub-sources according to FIG. 1.
Figure 3:
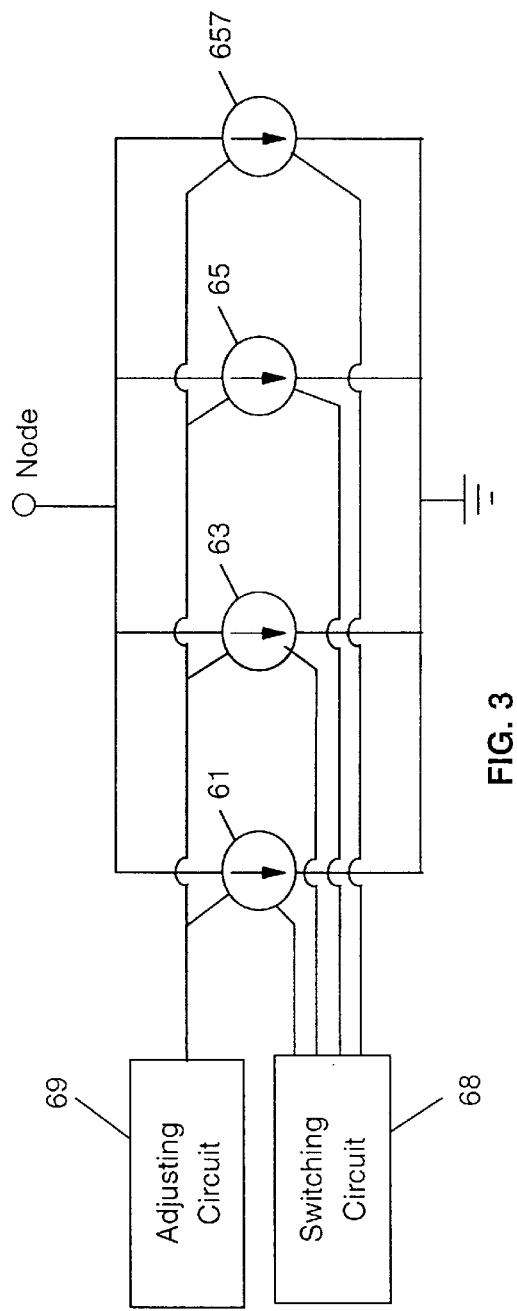
FIG. 3 is a block diagram of a bank of N-channel sub-sources according to FIG. 1.

The operation of the current sources according to the present invention will now be discussed in greater detail. Each of the sourcing current sources 21 and 23 includes a bank of switched, mirrored P-channel sub-sources as shown in FIG. 2. Each of the sinking current sources 25 and 29 includes a bank of switched, mirrored N-channel sub-sources as shown in FIG. 3. Moreover, each of the sub-sources within a bank can be individually switched so that each of the current sources can source or sink a plurality of discrete levels of current.

One of the sourcing current sources 21 or 23 can thus drive the respective Node to a voltage greater than Vdd/2 by sequentially switching on the P-channel sub-sources therein while the paired sinking current source 25 or 27 pulls the opposing Node to a voltage lower than Vdd by sequentially switching on the N-channel sub-sources therein. The opposing Nodes can then be brought back to Vdd/2 by sequentially switching the respective sub-sources off. When all of the current sources are switched off, the nodes N1 and N2 will be driven to Vdd/2 by the operational amplifier 35 coupled to Common Node Nc.

A bank of P-channel sub-sources 51, 53, 55, and 57 making up a sourcing current source are shown in FIG. 2, and a bank of N-channel sub-sources 61, 63, 65, and 67 making up a sinking current source are shown in FIG. 3. According to the present invention, the P-channel sub-sources and the N-channel sub-sources are preferably balanced so that sub-sources 51 and 61 source/sink a common current, so that sub-sources 53 and 63 source/sink a common current, so that sub-sources 55 and 65 source/sink a common current, and so that sub-sources 57 and 67 source/sink a common current. The paired current sources 21 and 27, and 23 and 25 can thus be operated to provide signals on Nodes N1 and N2 which are balanced about Vdd/2.

Each of the sub-sources within a bank can be weighted equally to provide a common current, or sub-sources within a bank can be weighted differently. In either case, each current source 21, 23, 25, and 27 includes the same number of matched sub-sources.

As shown in FIG. 2, each of the sourcing current sources 21 or 23 can include a plurality of P-channel sub-sources 51, 53, 55, and 57 coupled between the power supply voltage Vdd and the respective output node N. An adjusting circuit 59 can be used to either increase or decrease the current sourced by the sub-sources responsive to the output of the common mode correction circuit to maintain a balance between the sourcing and sinking current sources.

Each of the P-channel sub-sources can be individually switched using the switching circuit 58. The functions of the switching circuit can be implemented within the sourcing current source, implemented within the TCLC 31, or split between the current source and the TCLC.

Accordingly, the P-channel sub-sources can be sequentially switched on so that the current sourced to the Node rises by discrete increments over time. The sub-sources can then be sequentially switched off so that the current sourced to the Node decreases by the same discrete increments over time. A waveform of arbitrary shape can thus be generated thereby reducing the need for external filtering.

Figure 4:
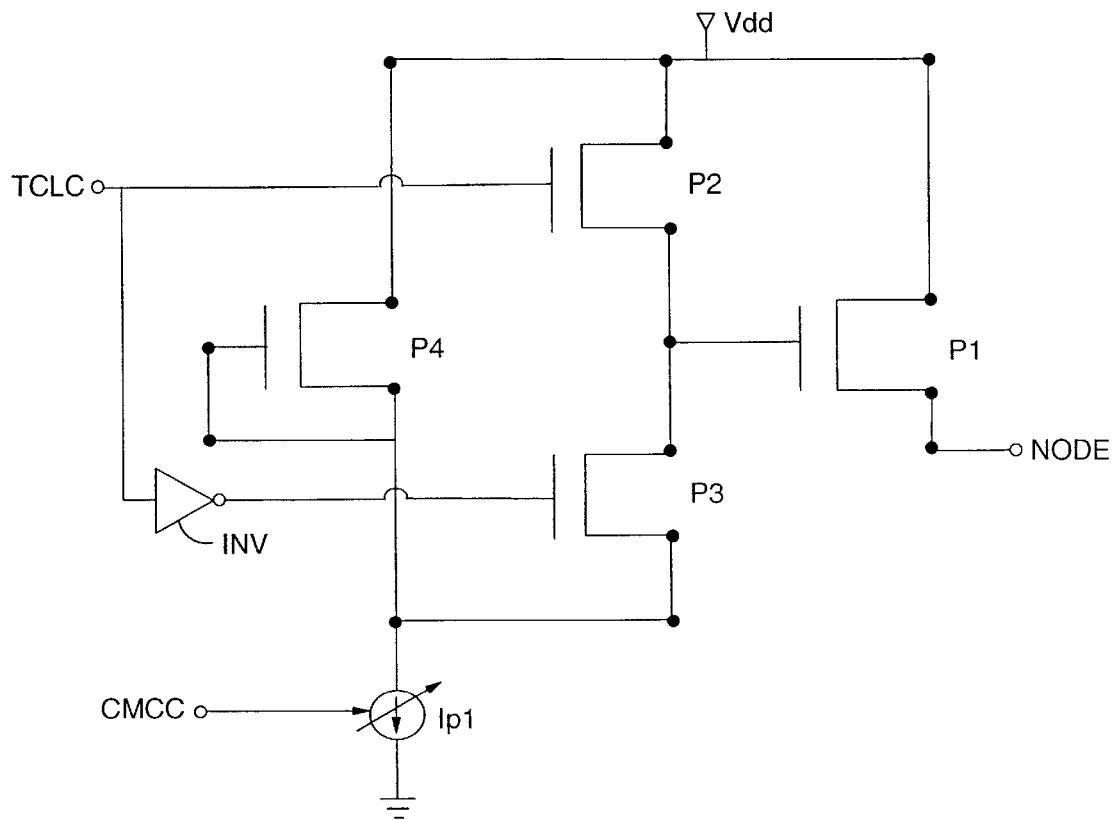
FIG. 4 is a schematic diagram of a first P-channel sub-source according to FIG. 2.

A schematic diagram for a first P-channel sub-source is illustrated in FIG. 4. As shown, the P-channel sub-source includes a P-channel transistor P1 coupled between Vdd and the Node, and P-channel transistors P2 and P3. A current mirror including the P-channel transistor P4 and the current source Ip1 can be used to set the current through transistor P1 sourced to the Node. Moreover, the current mirror can be used to provide the adjusting circuit 59 of FIG. 2 by varying the current through the current source Ip1 responsive to an output CMCC of the common mode correction circuit. The current sourced to the Node is switched on and off responsive to the switching signal TCLC generated by the transmit conditioning logic circuit.

The single current mirror including P-channel transistor P4 and the current source Ip1 can be used to set the current for each of the P-channel sub-sources making up a sourcing current source. Accordingly, the P-channel sub-sources in a sourcing current source can be simultaneously adjusted by varying the current through the current source Ip1 responsive to the output CMCC of the common mode correction circuit. Separate TCLC switching signals are provided to each of the sub-sources so that each of the sub-sources can be individually switched.

Figure 6:
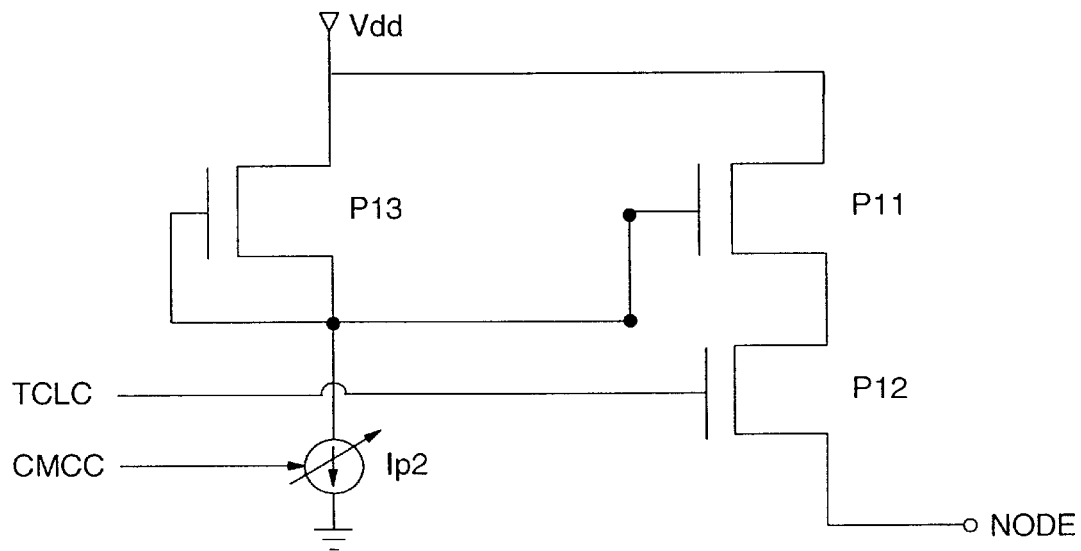
FIG. 6 is a schematic diagram of a second P-channel sub-source according to FIG. 2.

A second P-channel sub-source is illustrated in FIG. 6. As shown, the P-channel sub-source includes a P-channel transistor P11, and the current sourced to the Node is set by the current mirror including the P-channel transistor P13 and the current source Ip2. The current sourced to the Node is switched on and off by the P-channel transistor P12 responsive to the switching signal TCLC generated by the transmit conditioning logic. The current sourced by the P-channel transistor P11 can be adjusted by varying the current generated by the current source Ip2 responsive to the output signal CMCC generated by the common mode correction circuit.

As before, a single current mirror can be used to set the current sourced by each of the sub-sources within a sourcing current source. A separate switching transistor, however, is provided for each of the sub-sources, and each switching transistor is driven by a different TCLC switching signal so that each sub-source can be separately switched.

The structure of the sinking current sources is similar to that of the sourcing current sources. As shown in FIG. 3, each of the sinking current sources 25 or 27 can include a plurality of N-channel sub-sources 61, 63, 65, and 67 coupled between the respective output Node and the device ground. An adjusting circuit 69 can be used to either increase or decrease the current sunk by the sub-sources responsive to the output of the common mode correction circuit to maintain a balance between the sourcing and sinking current sources.

Each of the N-channel sub-sources can be individually switched using the switching circuit 58. The functions of the switching circuit can be implemented within the sinking current source, implemented within the TCLC 31, or split between the current source and the TCLC.

Accordingly, the N-channel sub-sources can be sequentially switched on so that the current sunk from the Node increases by discrete increments over time. The sub-sources can then be sequentially switched off so that the current sunk from the Node decreases by the same discrete increments over time. A relatively smooth waveform can thus be generated thereby reducing the need for external filtering.

Figure 5:
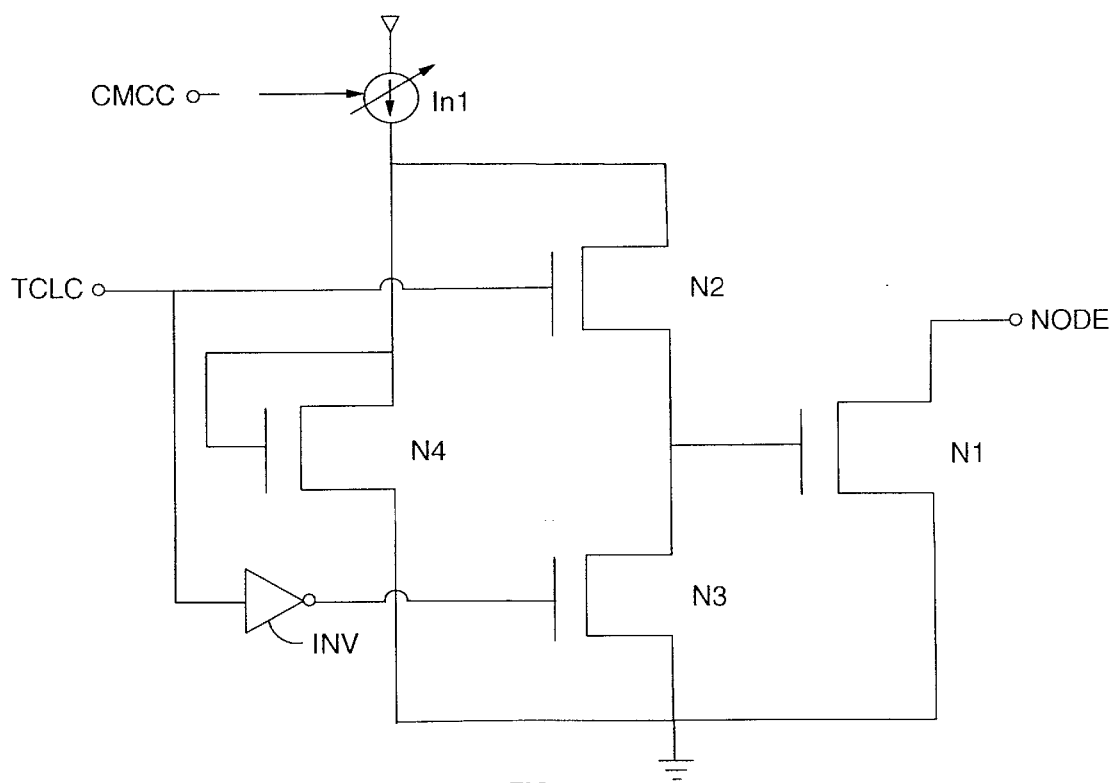
FIG. 5 is a schematic diagram of a first N-channel sub-source according to FIG. 3.

A schematic diagram of a first N-channel sub-source is illustrated in FIG. 5. As shown, the N-channel sub-source includes an N-channel transistor N1 coupled between the Node and ground, and N-channel transistors N2 and N3. A current mirror including the N-channel transistor N4 and the current source In1 can be used to set the current through transistor N1 sunk from the Node. Moreover, the current mirror can be used to provide the adjusting circuit 69 of FIG. 3 by varying the current through the current source In1 responsive to an output of the common mode correction circuit CMCC. The current sunk from the Node is switched on and off responsive to the switching signal TCLC generated by the transmit conditioning logic circuit.

The single current mirror including N-channel transistor N4 and the current source In1 can be used to set the current for each of the N-channel sub-sources making up a sinking current source. Accordingly, the N-channel sub-sources in a sinking current source can be simultaneously adjusted by varying the current through the current source In1 responsive to the output CMCC of the common mode correction circuit. Separate TCLC switching signals are provided to each of the sub-sources so that each of the sub-sources can be individually switched.

Figure 7:
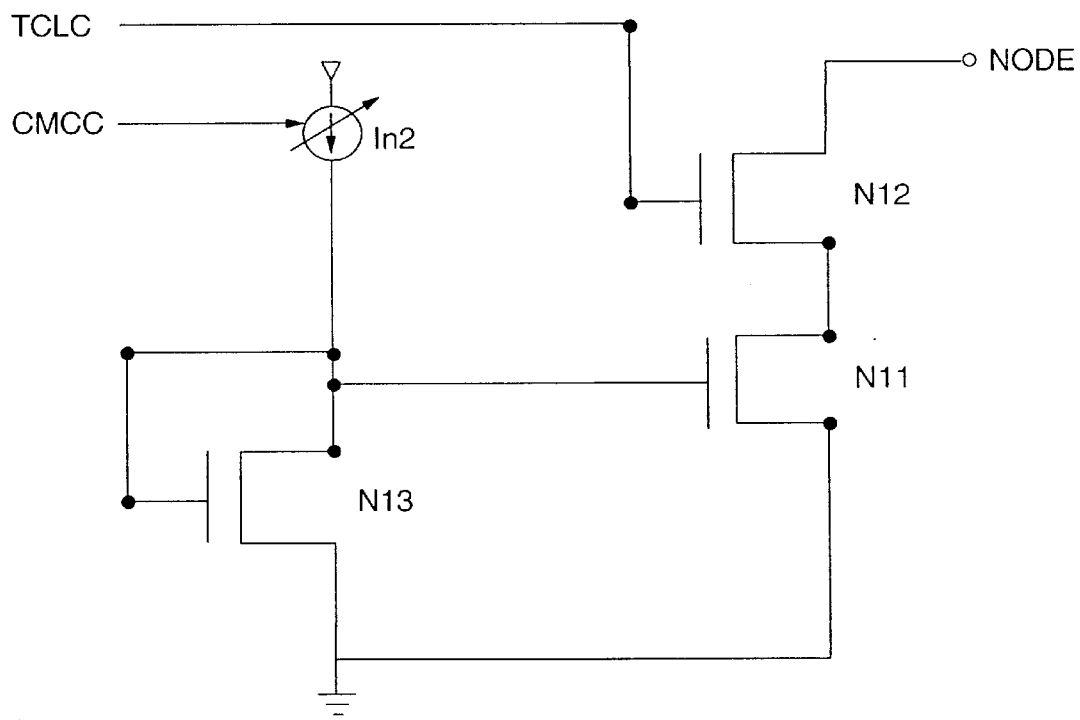
FIG. 7 is a schematic diagram of a second N-channel sub-source according to FIG. 3.

A schematic diagram of a second N-channel sub-source is illustrated in FIG. 7. As shown, the N-channel sub-source includes an N-channel transistor N11, and the current sunk from the Node is set by the current mirror including the N-channel transistor N13 and the current source In2. The current sunk from the Node is switched on and off by the N-channel transistor N12 responsive to the switching signal TCLC generated by the transmit conditioning logic. The current sunk by the N-channel transistor N11 can be adjusted by varying the current generated by the current source In2 responsive to the output signal CMCC generated by the common mode correction circuit.

As before, a single current mirror can be used to set the current sunk by each of the sub-sources within a sinking current source. A separate switching transistor, however, is provided for each of the sub-sources, and each switching transistor is driven by a different TCLC switching signal so that each sub-source can be separately switched.

Figure 8:
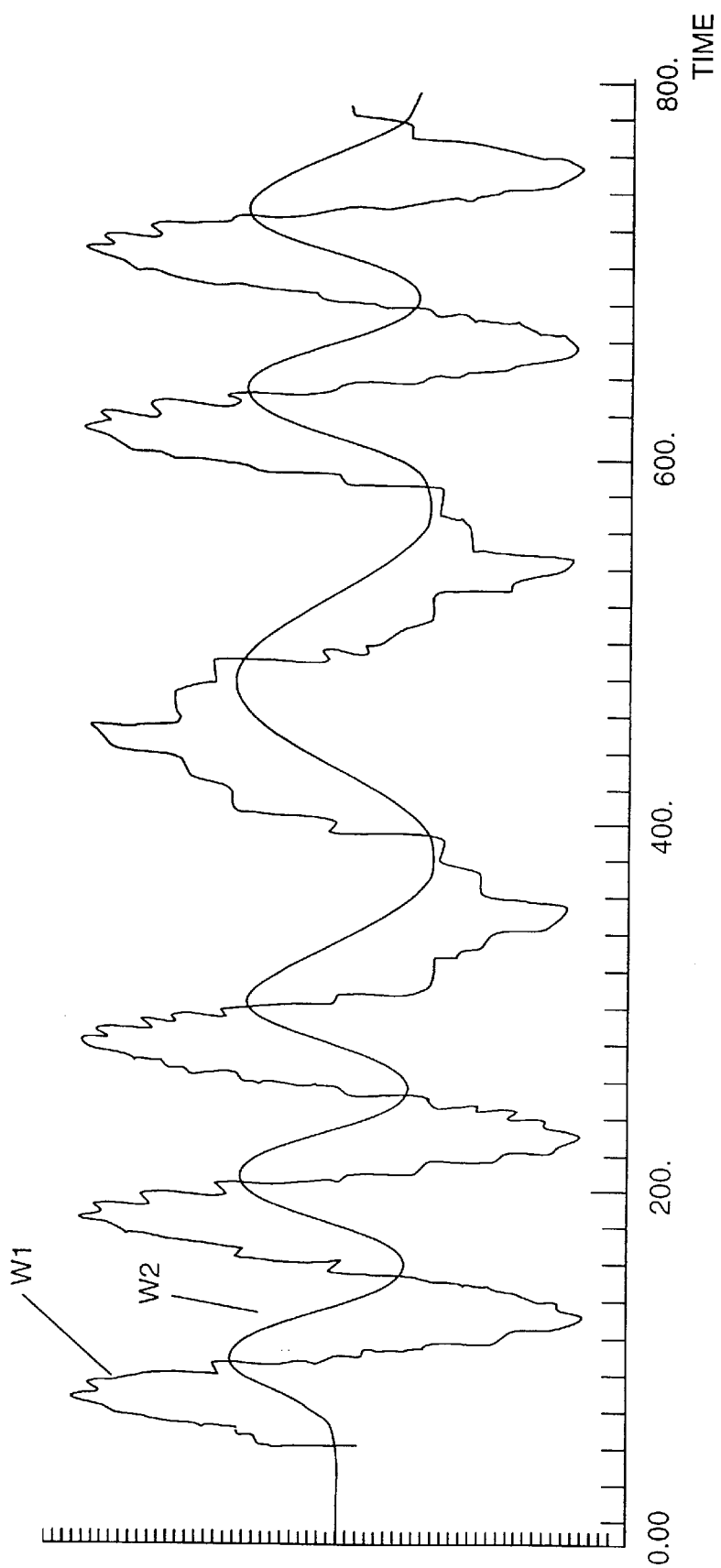
FIG. 8 is a graph illustrating a waveform generated by the circuit of FIG. 1.

FIG. 8 is a graph of an exemplary waveform generated by a driver generator according to the present invention as illustrated in FIG. 1. In particular, the network driver sources and sinks current to and from the output Nodes N1 and N2 which are coupled with the twisted pair cable TPC through the isolation transformer T. In addition, the capacitor C is coupled between the Nodes N1 and N2, as are the series connected resistors R1 and R2. The waveform W1 is the waveform generated between the Nodes N1 and N2, and the waveform W2 is the resulting waveform generated at the end of the twisted pair cable TPC loaded with a 100 ohm resistive load.

The generation of the waveforms of FIG. 8 will now be discussed with reference to the network driver of FIG. 1. At time t=0.00, the current sources 21, 23, 25, and 27 are switched off so that the network driver is not transmitting, and so that no signal appears on the twisted pair cable TPC. More particularly, the Nodes N1 and N2 are driven in the example being discussed to the voltage Vdd/2 by the operational amplifier 35 through the common node Nc and the resistors R1 and R2. Because the current sources 21, 23, 25, and 27 are switched off when there is no transmission, power consumption is reduced.

When transmission begins at approximately Time=50, the sub-sources for each of the sourcing current source 21 and the paired sinking current source 27 are sequentially switched on until the waveform W1 rises to the initial positive peak. These sub-sources are then sequentially switched off so that the output Nodes N1 and N2 go back to Vdd/2. At approximately Time=85, the sub-sources for each of the sourcing current source 23 and the paired sinking current source 25 are sequentially switched on until the waveform W1 falls to the initial negative peak. These sub-sources are then sequentially switched off so that the output Nodes N1 and N2 go back to Vdd/2.

The paired current sources can thus be alternatively switched to provide the waveform W1 as shown in FIG. 8. By sequentially switching matched sub-sources for the paired current sources, the need to provide filtering for the waveform generator can be reduced. In other words, undesired dI/dt can be reduced for the current being switched because current sub-sources are switched on and off in a staged fashion. While the waveform W1 may still include relatively small discontinuities as a result of switching the sub-sources, the waveform W2 generated on the twisted pair cable TPC is not significantly affected.

The network driver of the present invention can thus be used to generate a differential, peak-to-peak voltage level between 4.4 and 5.6 volts on the secondary side of the 1 to square root of 2 transformer. On the primary side of the transformer, the voltage can be expected to be in the range of 3.1 volts peak-to-peak to 4 volts peak-to-peak. Moreover, the network driver discussed above can be used to produce voltage steps for both 10 MHz and 5 Mhz waveforms.

The weightings for each of the sub-sources within a current source can be the same so that each sub-source sources or sinks an equal amount of current. Alternately, the weightings for sub-sources within a current source can be weighted differently so that different sub-sources source or sink different currents. Corresponding sub-sources for each of the current sources, however, should be matched (have equal weightings). In other words, in a waveform generator wherein each current source includes four sub-sources, each of the current sources should include a first sub-source having a first common weighting, a second sub-source having a second common weighting, a third sub-source having a third common weighting, and a fourth sub-source having a fourth common weighting. The first through fourth weightings can all be the same, they can all be different, or some can be the same and some can be different.

The relative weightings of the P-channel sub-sources within the sourcing current sources 21 and 23 can be maintained through transistor design. Similarly, the relative weightings of the N-channel sub-sources within the sinking current sources 25 and 27 can also be maintained through transistor design. In may be difficult, however, to maintain consistent relative weightings for the P-channel and N-channel sub-sources in paired sourcing and sinking current sources because of semiconductor process variations.

Accordingly, the adjusting circuit 59 or 69 can be used to adjust the current generated by the sub-sources within a sourcing or sinking current source responsive to the output of the common mode correction circuit 37. One adjusting circuit can be provided for both sourcing current sources 21 and 23 and/or one adjusting circuit can be provided for both sinking current sources 25 and 27. According to one alternative, the sinking current sources 25 and 27 can be designed to sink slightly more current than the sourcing current sources 21 and 23 source. A single adjusting circuit can then be provided to adjust the output of the sourcing current sources to compensate for any difference responsive to the common mode correction circuit. Accordingly, the sourcing current sources will always be adjusted to provide more current.

Network drivers according to the present invention can thus be used to drive data network cables such as twisted pair cables for Ethernet networks. The ability to source and sink a plurality of discrete levels of current allows the generation of relatively smooth waveforms thereby reducing the need for additional filtering circuits. In addition, power consumption can be reduced when there are no transmissions because the current sources can be switched off.

While the network drivers of the present invention have been discussed in the context of data network operations, network drivers according to the present invention can have other applications such as digital-to-analog conversion.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A network driver for generating a waveform between first and second nodes, said network driver comprising:

a first driver circuit coupled to said first node wherein said first driver circuit sources first and second discrete currents to the first node and sinks said first and second discrete currents from the first node wherein said first and second discrete currents are different wherein said first driver circuit includes a first sourcing current source coupled between the first node and a first reference voltage, wherein the first sourcing current source sources current to the first node when activated, and a first sinking current source coupled between the first node and a second references voltage, wherein the first sinking current source sinks current from the first output node when activated;

a second driver circuit coupled to the second node wherein said second driver circuit sources said first and second discrete currents to said second node and sinks said first and second discrete currents from the second node wherein said second driver circuit includes a second sourcing current source coupled between the second node and the first reference voltage, wherein the second sourcing current source sources current to the second node when activated, and a second sinking current source coupled between the second node and the second reference voltage, wherein the second sinking current source sinks current from the second node when activated; and a controller which controls said driver circuits so that said first driver circuit sources and said second driver circuit sinks said first current during a first period of time followed by said first driver circuit sourcing and said second driver circuit sinking said second current during a second period of time and so that said first driver circuit sinks and said second driver circuit sources said first current during a third period of time followed by said first driver circuit sinking and said second driver circuit sourcing said second current during a fourth period of time wherein said first, second, third, and fourth periods of time do not overlap wherein said controller activates said current sources in pairs so that said first sourcing current source and said second sinking current source are commonly activated, and so that said second sourcing current source and said first sinking current source are commonly activated, and wherein said controller provides that said first sourcing and sinking current sources are not activated concurrently and wherein said controller provides that said second sourcing and sinking current sources are not activated concurrently so that current is not concurrently sourced and sunk to and from either of the respective nodes by current sources coupled to the respective nodes.

2. A network driver according to claim 1 wherein the first reference voltage comprises a supply voltage and wherein the second reference voltage comprises an electrical ground.

3. A network driver according to claim 1 wherein a first impedance is provided between the first node and a common node and wherein a second impedance is provided between the second node and the common node, said network driver further comprising:
a voltage source for maintaining a voltage at the common node equal to one half a difference between the first reference voltage and the second reference voltage.

4. A network driver according to claim 1 further comprising:
a bias adjustor which detects an imbalance between said currents sourced by said first and second sourcing current sources and said currents drawn by said first and second sinking current sources and which adjusts a bias of at least one of said current sources responsive to said detected imbalance to reduce said imbalance.

5. A network driver according to claim 4 wherein said bias adjustor adjusts said first and second sinking current sources responsive to said detected imbalance.

6. A network driver according to claim 1 wherein said controller turns said driver circuits off when said network driver is not transmitting.

7. A network driver according to claim 1 further comprising:
a first resistor coupled between said first node and a common node;
a second resistor coupled between said second node and said common node;
an isolation transformer having a primary side and a secondary side wherein said primary side is coupled with said first and second nodes; and
a data network cable coupled with said secondary side of said isolation transformer.

8. A network driver for generating a waveform between first and second nodes, said network driver comprising:
a first driver circuit coupled to said first node wherein said first driver circuit sources first and second discrete currents to the first node and sinks said first and second discrete currents from the first node wherein said first and second discrete currents are different, wherein said first driver circuit includes a first sourcing current source coupled between the first node and a first reference voltage, wherein the first sourcing current source sources current to the first node when activated, and a first sinking current source coupled between the first node and a second reference voltage, wherein the first sinking current source sinks current from the first output node when activated;
a second driver circuit coupled to the second node wherein said second driver circuit sources said first and second discrete currents to said second node and sinks said first and second discrete currents from the second node wherein said second driver circuit includes a second sourcing current source coupled between the second node and the first reference voltage, wherein the second sourcing current source sources current to the second node when activated, and a second sinking current source coupled between the second node and the second reference voltage, wherein the second sinking current source sinks current from the second node when activated;
a controller which controls said driver circuits so that said first driver circuit sources and said second driver circuit sinks said first current during a first period of time followed by said first driver circuit sourcing and said second driver circuit sinking said second current during a second period of time and so that said first driver circuit sinks and said second driver circuit sources said first current during a third period of time followed by said first driver circuit sinking and said second driver circuit sourcing said second current during a fourth period of time wherein said first, second, third, and fourth periods of time do not overlap, wherein said controller activates said current sources in pairs so that said first sourcing current source and said second sinking current source are commonly activated, and so that said second sourcing current source and said first sinking current source are commonly activated, and wherein said controller activates said current sources so that said first sourcing current source and said second sinking current source respectively source and sink a first common current when activated, and so that said second sourcing current source and said first sinking current source respectively source and sink a second common current when activated; and a bias adjustor which detects an imbalance between said currents sourced by said first and second balanced sourcing current sources and said currents drawn by said first and second balanced sinking current sources and which adjusts a bias of at least one of said current sources responsive to said detected imbalance to reduce said imbalance.

9. A network driver according to claim 8 wherein said controller provides that said first sourcing and sinking current sources are not activated concurrently and wherein said controller provides that said second sourcing and sinking current sources are not activated concurrently.

10. A network driver for generating a waveform between first and second nodes, said waveform generator comprising:

a first sourcing current source coupled between the first node and a first reference voltage, wherein the first sourcing current source sources current to the first node when activated;

a second sourcing current source coupled between the second node and the first reference voltage, wherein the second sourcing current source sources current to the second node when activated;

a first sinking current source coupled between the first node and a second reference voltage, wherein the first sinking current source sinks current from the first node when activated;

a second sinking current source coupled between the second node and the second reference voltage, wherein the second sinking current source draws current from the second node when activated wherein each of said sourcing current sources provides one of a plurality of discrete currents when activated and wherein each of said sinking current source sinks one of said plurality of discrete currents when activated; and a controller which activates said current sources in pairs so that said first sourcing current source and said second sinking current source are commonly activated, and so that said second sourcing current source and said first sinking current source are commonly activated wherein said controller provides that said first sourcing and sinking current sources are not activated concurrently and wherein said controller provides that said second sourcing and sinking current sources are not activated concurrently so that current is not concurrently sourced and sunk to and from either of the respective nodes by current sources coupled to the respective nodes.

11. A network driver according to claim 10 wherein a first impedance is provided between the first node and a common node and wherein a second impedance is provided between the second node and the common node, said network driver further comprising:

a voltage source for maintaining a voltage at the common node equal to one half a difference between the first reference voltage and the second reference voltage.

12. A network driver according to claim 10 further comprising:

a bias adjustor which detects an imbalance between said currents provided by sourcing current sources and said currents drawn by said sinking current sources and which adjusts a bias of at least one of said current sources responsive to said detected imbalance to reduce said imbalance.

13. A network driver according to claim 12 wherein said bias adjustor adjusts said first and second sinking current sources responsive to said detected imbalance.

14. A network driver according to claim 10 wherein said controller turns said current sources off when said waveform generator is not transmitting.

15. A network driver according to claim 10 further comprising:

a first resistor coupled between said first node and a common node;

a second resistor coupled between said second node and said common node;

an isolation transformer having a primary side and a secondary side wherein said primary side is coupled with said first and second nodes; and a data network cable coupled with said secondary side of said isolation transformer.

16. A network driver according to claim 10 wherein the first reference voltage comprises a supply voltage and the second reference voltage comprises an electrical ground.

17. A network driver for generating a waveform between first and second nodes, said network driver comprising:

a first sourcing current source coupled between the first node and a first reference voltage, wherein the first sourcing current source sources current to the first node when activated;

a second sourcing current source coupled between the second node and the first reference voltage, wherein the second sourcing current source sources current to the second node when activated;

a first sinking current source coupled between the first node and a second reference voltage, wherein the first sinking current source sinks current from the first node when activated;

a second sinking current source coupled between the second node and the second reference voltage, wherein the second sinking current source draws current from the second node when activated; and a controller which activates said current sources in pairs so that said first sourcing current source and said second sinking current source are commonly activated, and so that said second sourcing current source and said first sinking current source are commonly activated;

wherein each of said sourcing current sources provides one of a plurality of discrete currents when activated and wherein each of said sinking current source sinks one of said plurality of discrete currents when activated, and wherein said controller activates said current sources so that said first sourcing current source and said second sinking current source respectively source and sink a first common current when activated, and so that said second sourcing current source and said first sinking current source respectively source and sink a second common current when activated; and a bias adjustor which detects an imbalance between said currents provided by said sourcing current sources and said currents drawn by said sinking current sources and which adjusts a bias of at least one of said current sources responsive to said detected imbalance to reduce said imbalance.

18. A network driver according to claim 17 wherein said first common current advances from a first one of said discrete currents to a second one of said discrete currents when said first sourcing current source and said second sinking current source are activated, and wherein said second common current advances from said first discrete currents to said second discrete current when said second sourcing current source and said first sinking current source are activated.

19. A network driver according to claim 17 wherein said controller provides that said first sourcing and sinking current sources are not activated concurrently and wherein said controller provides that said second sourcing and sinking current sources are not activated concurrently.

20. A network driver for generating a waveform between first and second nodes of a data network connection wherein a first impedance is provided between the first node and a common node, wherein a second impedance is provided between the second node and the common node, and wherein the first and second nodes are coupled to a data cable through an isolation transformer, said network driver comprising:

a first driver circuit coupled to said first node wherein said first driver circuit sources a plurality of discrete currents including first and second discrete currents to the first node and sinks said plurality of discrete currents including said first and second discrete currents from the first node wherein said first driver circuit includes a first sourcing current source coupled between the first node and a first reference voltage, wherein the first sourcing current source sources said plurality of discrete currents to tie first node when activated, and a first sinking current source coupled between the first node and a second reference, wherein the first sinking current source sinks said plurality of discrete currents from the first node when activated and wherein said first and second discrete currents are different;

a second driver circuit coupled to the second node wherein said second driver circuit sources said plurality of discrete currents including said first and second discrete currents to said second node and sinks said plurality of discrete currents including said first and second discrete currents from the second node wherein said second driver circuit includes a second sourcing current source coupled between the second node and the first reference voltage, wherein the second sourcing current source sources said plurality of discrete currents to the second node when activated, and a second sinking current source coupled between the second node and The second reference voltage, wherein the second sinking current source sinks said plurality of discrete currents from the second node when activated; and a controller which controls said driver circuits so that said first driver circuit sources and said second driver circuit sinks said first discrete current during a first period of time followed by said first driver circuit sourcing and said second driver circuit sinking said second discrete current during a second period of time and so that said first driver circuit sinks and said second driver circuit sources said first discrete current during a third period of time followed by said first driver circuit sinking and said second driver circuit sourcing said second discrete current during a fourth period of time wherein said first, second, third, and fourth periods of time do not overlap wherein said controller activates said current sources in pairs so that said first sourcing current source and said second sinking current source are commonly activated, and so that said second sourcing current source and said first sinking current source are commonly activated, and wherein said controller provides that said first sourcing and sinking current sources are not activated concurrently and wherein said controller provides that said second sourcing and sinking current sources are not activated concurrently so that current is not concurrently sourced and sunk to and from either of the respective nodes by current sources coupled to the respective nodes.

21. A network driver according to claim 20, said network driver further comprising:

a voltage source for maintaining a voltage at the common node equal to one half a difference between the first reference voltage and the second reference voltage.

22. A network driver according to claim 20 wherein the first reference voltage comprises a supply voltage and wherein the second reference voltage comprises an electrical ground.

23. A network driver according to claim 20 further comprising:

a bias adjustor which detects an imbalance between said currents sourced by said sourcing current sources and said currents drawn by said sinking current sources and which adjusts a bias of at least one of said current sources responsive to said detected imbalance to reduce said imbalance.

24. A network driver according to claim 23 wherein said bias adjustor adjusts said first and second sinking current sources responsive to said detected imbalance.

25. A network driver according to claim 20 wherein said controller turns said driver circuits off when said waveform generator is not transmitting.

26. A network driver for generating a waveform between first and second nodes of a data net connection wherein a first impedance is provided between the first node and a common node, wherein a second impedance is provided between the second node and the common node, and wherein the first and second nodes are coupled to a data cable through an isolation transformer, said network driver comprising:

a first driver circuit coupled to said first node wherein said first driver circuit sources first and second discrete currents to the first node and sinks said first and second discrete currents from the first node wherein said first driver circuit includes a first sourcing current source coupled between the first node and a first reference voltage, wherein the first sourcing current source sources current to the first node when activated, and a first sinking current source coupled between the first node and a second reference, wherein the first sinking current source sinks current from the first node when activated and wherein said first and second discrete currents are different;

a second driver circuit coupled to the second node wherein said second driver circuit sources said first and second discrete currents to said second node and sinks said first and second discrete currents from the second node wherein said second driver circuit includes a second sourcing current source coupled between the second node and the first reference voltage, wherein the second sourcing current source sources current to the second node when activated, and a second sinking current source coupled between the second node and the second reference voltage, wherein the second sinking current source sinks current from the second node when activated;

a controller which controls said driver circuits so that said first driver circuit sources and said second driver circuit sinks said first current during a first period of time followed by said first driver circuit sourcing and said second driver circuit sinking said second current during a second period of time and so that said first driver circuit sinks and said second driver circuit sources said first current during a third period of time followed by said first driver circuit sinking and said second driver circuit sourcing said second current during a fourth period of time wherein said first, second, third, and fourth periods of time do not overlap wherein said controller activates said current sources in pairs so that said first sourcing current source and said second sinking current source are commonly activated, and so that said second sourcing current source and said first sinking current source are commonly activated, and wherein said controller activates said current sources so that said first sourcing current source and said second sinking current source respectively source and sink a first common current when activated, and so that said second sourcing current source and said first sinking current source respectively source and sink a second common current when activated; and a bias adjustor which detects an imbalance between said currents sourced by said sourcing current sources and said currents drawn by said sinking current sources and which adjusts a bias of at least one of said current sources responsive to said detected imbalance to reduce said imbalance.

27. A network driver according to claim 26 wherein said first common current advances from a first one of said discrete currents to a second one of said discrete currents when said first sourcing current source and said second sinking current source are activated, and wherein said second common current source advances from said first discrete current to said second discrete current when said second sourcing current source and said first sinking current source are activated.

28. A network driver according to claim 26 wherein said controller provides that said first sourcing and sinking current sources are not activated concurrently and wherein said controller provides that said second sourcing and sinking current sources are not activated concurrently.

29. A network driver for generating a waveform between first and second nodes of a data network connection wherein a first impedance is provided between the first node and a common node, wherein a second impedance is provided between the second node and the common node, and wherein the first and second nodes are coupled to a data cable through an isolation transformer, said network driver comprising:

a first sourcing current source coupled between the first node and a first reference voltage, wherein the first sourcing current source sources current to the first node when activated;

a second sourcing current source coupled between the second node and the first reference voltage, wherein the second sourcing current source sources current to the second node when activated;

a first sinking current source coupled between the first node and a second reference voltage, wherein the first sinking current source sinks current from the first node when activated;

a second sinking current source coupled between the second node and the second reference voltage, wherein the second sinking current source draws current from the second node when activated wherein each of said sourcing current sources provides one of a plurality of discrete currents when activated and wherein each of said sinking current source sinks one of said plurality of discrete currents when activated; and a controller which activates said current sources in pairs so that said first sourcing current source and said second sinking current source are commonly activated, and so that said second sourcing current source and said first sinking current source are commonly activated, wherein said controller provides that said first sourcing and sinking current sources are not activated concurrently and wherein said controller provides that said second sourcing and sinking current sources are not activated concurrently so that current is not concurrently sourced and sunk to and from either of the respective nodes by current sources coupled to the respective nodes.

30. A network driver according to claim 29, said network driver further comprising:

a voltage source for maintaining a voltage at the common node equal to one half a difference between the first reference voltage and the second reference voltage.

31. A network driver according to claim 29 wherein the first reference voltage comprises a supply voltage and wherein the second reference voltage comprises an electrical ground.

32. A network driver according to claim 29 further comprising:

a bias adjustor which detects an imbalance between said currents provided by said sourcing current sources and said currents drawn by said sinking current sources and which adjusts a bias of at least one of said current sources responsive to said detected imbalance to reduce said imbalance.

33. A network driver according to claim 32 wherein said bias adjustor adjusts said first and second sinking current sources responsive to said detected imbalance.

34. A network driver for generating a waveform between first and second nodes of a data network connection wherein a first impedance is provided between the first node and a common node, wherein a second impedance is provided between the second node and the common node, and wherein the first and second nodes are coupled to a data cable through an isolation transformer, said network driver comprising:

a first sourcing current source coupled between the first node and a first reference voltage, wherein the first sourcing current source sources current to the first node when activated, a second sourcing current source coupled between the second node and the first reference voltage, wherein the second sourcing current source sources current to the second node when activated;

a first sinking current source coupled between the first node and a second reference voltage, wherein the first sinking current source sinks current from the first node when activated;

a second sinking current source coupled between the second node and the second reference voltage, wherein the second sinking current source draws current from the second node wren activated wherein each of said sourcing current sources provides one of a plurality of discrete currents when activated and wherein each of said sinking current source sinks one of said plurality of discrete currents when activated; and a controller which activates said current sources in pairs so that said first sourcing current source and said second sinking current source are commonly activated, and so that said second sourcing current source and said first sinking current source are commonly activated wherein said controller activates said current sources so that said first sourcing current source and said second sinking current source respectively source and sink a first common current when activated, and so that said second sourcing current source and said first sinking current source respectively source and sink a second common current when activated; and a bias adjustor which detects an imbalance between said currents provided by said sourcing current sources and said currents drawn by said sinking current sources and which adjusts a bias of at least one of said balanced current sources responsive to said detected imbalance to reduce said imbalance.

35. A network driver according to claim 34 wherein said first common current advances from a first one of said discrete currents to a second one of said discrete currents when said first sourcing current source and said second sinking current source are activated, and wherein said second common current advances from said first discrete currents to said second discrete current when said second sourcing current source and said first sinking current source are activated.

36. A network driver according to claim 34 wherein said controller provides that said first sourcing and sinking current sources are not activated concurrently and wherein said controller provides that said second sourcing and sinking current sources are not activated concurrently.

37. A network driver according to claim 34 wherein said controller turns said current sources off when said waveform generator is not transmitting.

* * * * *